(No Model.) 5 Sheets—Sheet 1.

G. LEVE.
SLEEPING CAR.

No. 357,531. Patented Feb. 8, 1887.

WITNESSES:
C. R. Marilton
G. M. Chamberlain

INVENTOR
Gustave Leve
BY C. Chapin
ATTORNEYS (No Model.) 5 Sheets—Sheet 2.

G. LEVE.

SLEEPING CAR.

No. 357,531. Patented Feb. 8, 1887.

WITNESSES:
C C Moulton
G. M. Chamberlain

INVENTOR
Gustave Leve
BY
ATTORNEYS (No Model.) 5 Sheets—Sheet 3.
G. LEVE.
SLEEPING CAR.
No. 357,531. Patented Feb. 8, 1887.
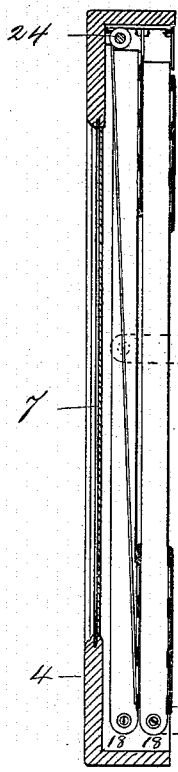
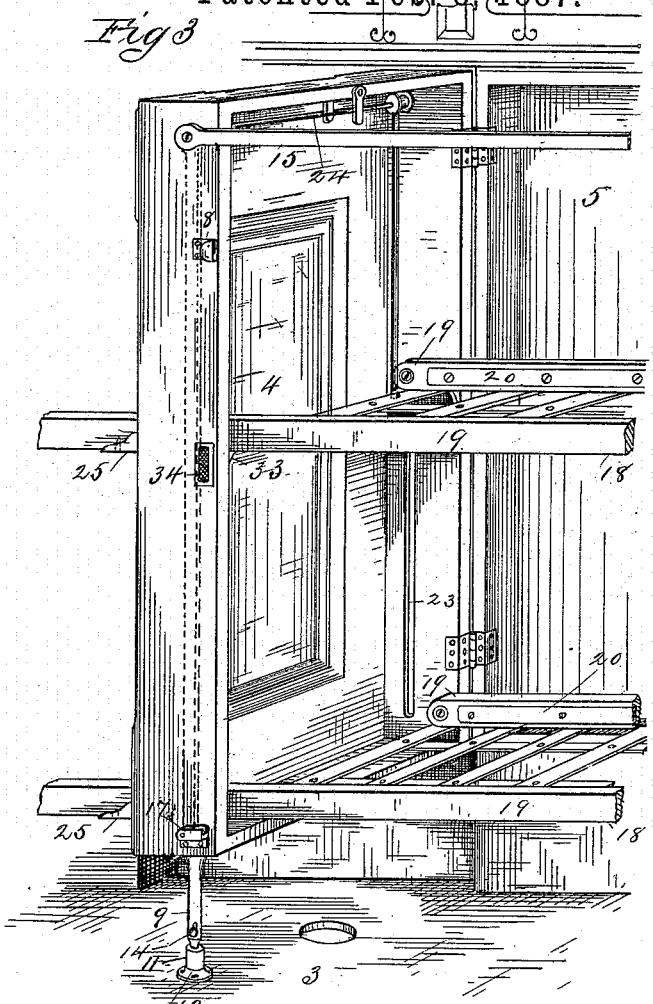
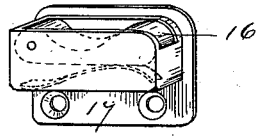
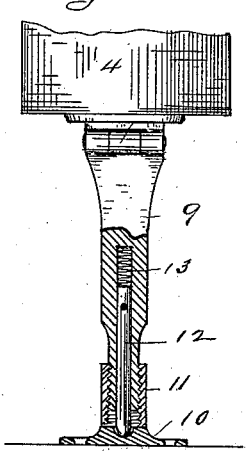
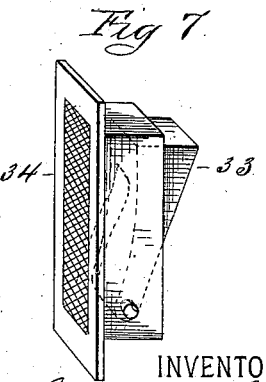
WITNESSES:
INVENTOR
Gustave Leve
BY
ATTORNEYS (No Model.) 5 Sheets—Sheet 4.
G. LEVE.
SLEEPING CAR.
No. 357,531. Patented Feb. 8, 1887.
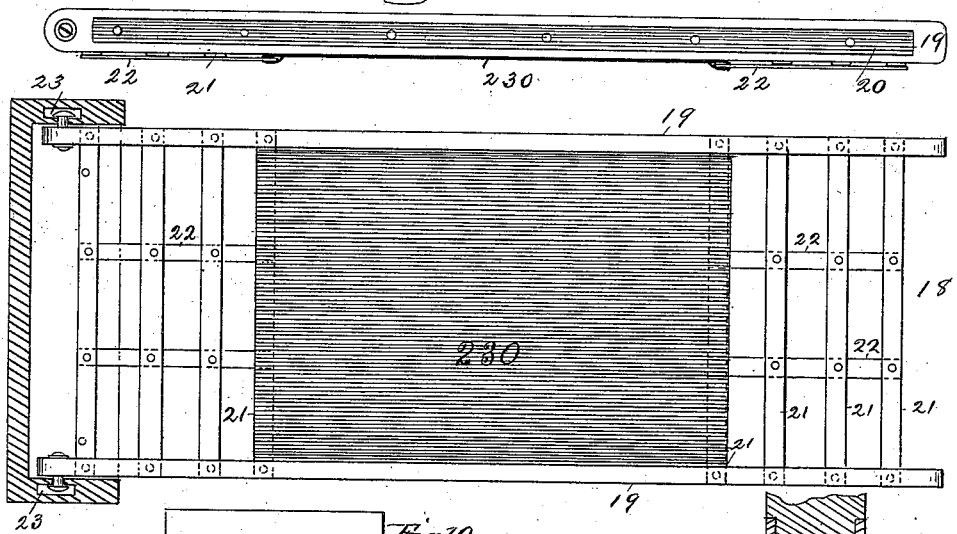
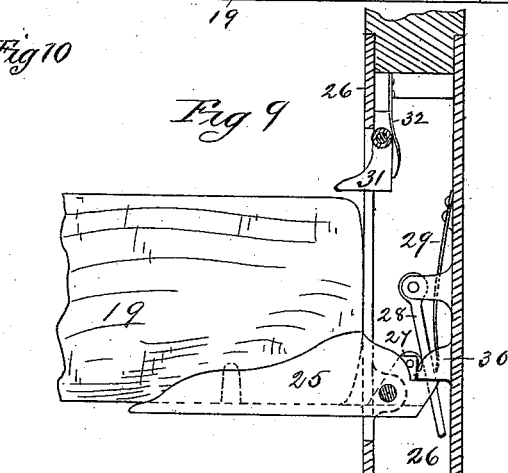
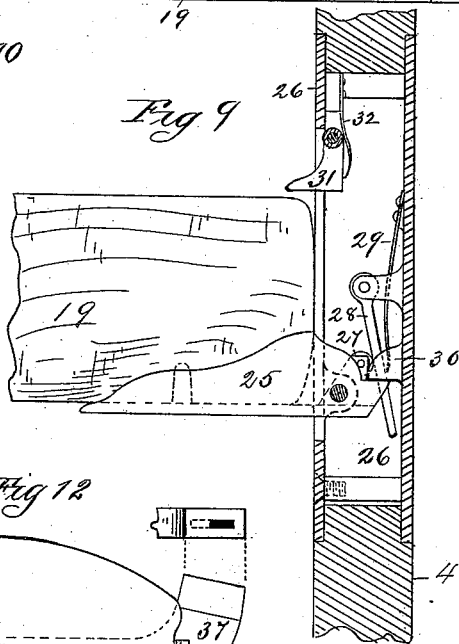
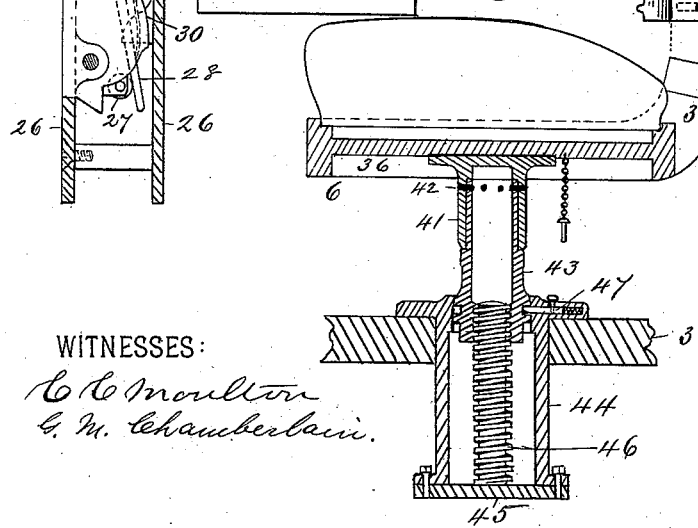
WITNESSES:
C. C. Moulton
G. M. Chamberlain.
INVENTOR
Gustave Leve
BY
ATTORNEYS (No Model.)

G. LEVE.
SLEEPING CAR.

No. 357,531. Patented Feb. 8, 1887.

UNITED STATES PATENT OFFICE.

GUSTAVE LEVE, OF NEW YORK, N. Y., ASSIGNOR TO AZARIAH B. HARRIS, OF SPRINGFIELD, MASSACHUSETTS.

SLEEPING-CAR.

SPECIFICATION forming part of Letters Patent No. 357,531, dated February 8, 1887.

Application filed March 13, 1886. Serial No. 195,080. (No model.)

*To all whom it may concern:*

Be it known that I, GUSTAVE LEVE, a citizen of the United States, residing at New York, in the county of New York and State of New York, have invented new and useful Improvements in Sleeping-Cars, of which the following is a specification.

This invention relates to improvements in sleeping-cars, and is in the nature of an improvement upon the patent to G. Leve, of September 5, 1876; and the invention consists in the improved construction and arrangement of the interior fittings of the car, as hereinafter fully described, and pointed out in the claims.

Figure 1:
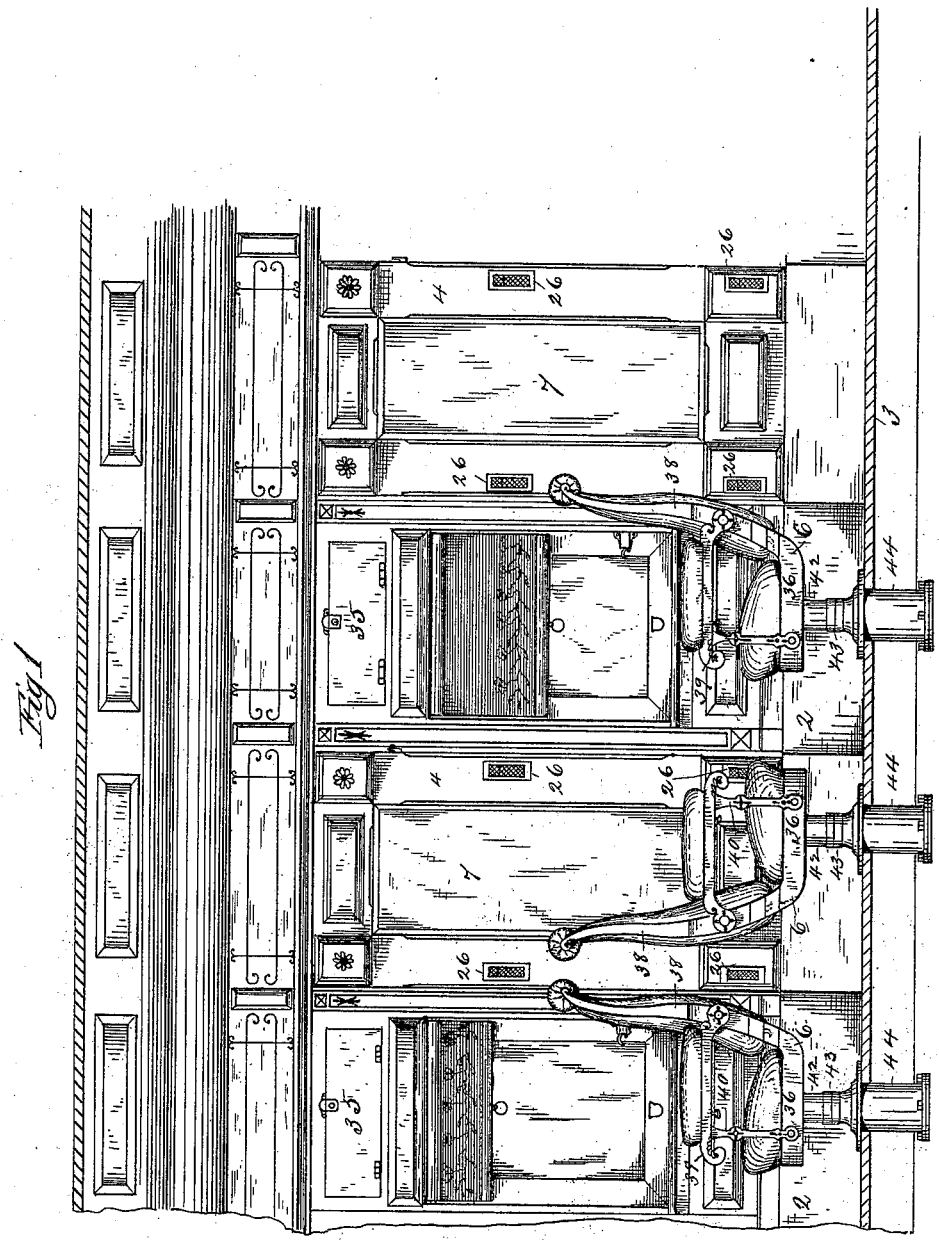
Figure 2:
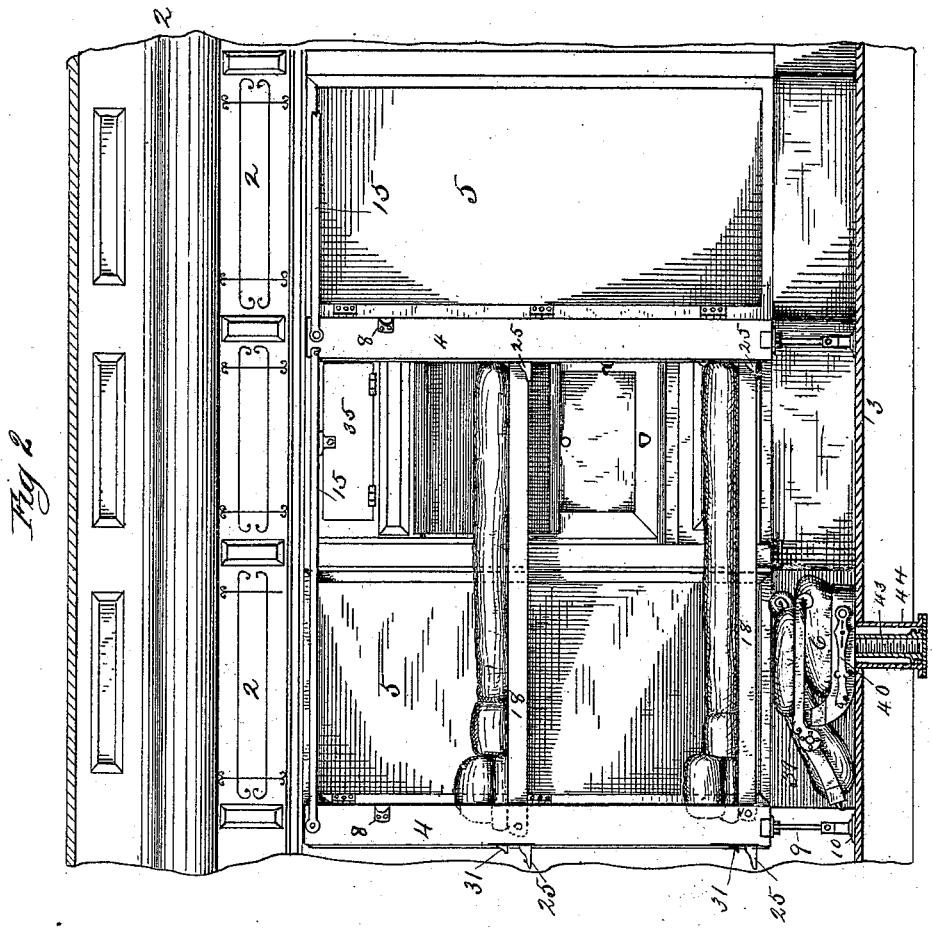
Figure 13:
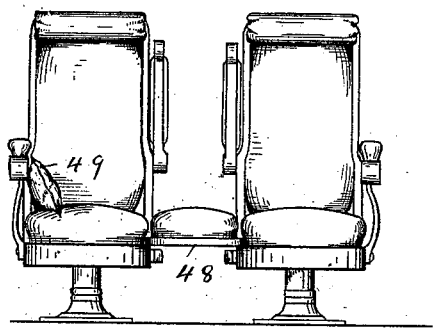

In the drawings forming part of this specification, Figures 1 and 2 are side elevations of portions of one side of the interior of a sleeping-car embodying my improvements, Fig. 1 showing the position of the chairs and bed-lockers when the car is arranged for day use, and Fig. 2 illustrating the appearance of said parts when the beds are made up. Fig. 3 is a perspective view showing a portion of the interior of the car, one bed-locker in open position, and parts of the bed-frames, together with other detail parts, hereinafter described. Fig. 4 is a vertical section of one of the bed-lockers, showing therein, in edge view, the two bed-frames. Fig. 5 is an edge view (enlarged) of the lower corner of one of the lockers, and showing in side elevation, partly in section, the hinged leg on which said locker is supported when open. Fig. 6 is a perspective view (enlarged) of the curtain-rod catch. Fig. 7 is a like view of the spring-catch which supports one end of the upper bed. Fig. 8 is an edge and a plan view of one of the bed-frames, and showing a transverse section of one of the lockers. Fig. 9 is a longitudinal section of a portion of one of the lockers, showing the supporting devices for one end of the bed and an end of the latter. Fig. 10 is a plan view of the interior of one of the pivoted bed-brackets; and Fig. 11 is a vertical section of said bracket-case, showing its parts in a closed position. Fig. 12 is a vertical section of the chair-seat frame and its pivotal supporting devices, together with a section of the floor of the car. Fig. 13 is a front elevation of two of the chairs arranged as a sofa.

In the drawings, 2 indicates the side of a car, and 3 the floor thereof.

In Fig. 1 is shown a portion of the side of the interior of the car, in which the bed-lockers 4 are shown shut and fastened against the side 2 of the car, and they form in appearance projecting panels thereon, each side of the window reaching a little above and a little below the latter. In said Fig. 1 are also shown several of the chairs, 6, which are used in the car which is furnished with said lockers. The said lockers and chairs above described, and shown in Fig. 1, illustrate the appearance of both sides of the sleeping-car when the latter is arranged for day-traveling, and when the bed-lockers and chairs are so arranged the car has every appearance of a parlor-car, and nothing is shown to indicate that the car is provided with the requisite fittings to constitute it a sleeping-car. The said bed-lockers 4 are made in the form of a shallow box of rectangular form, as shown in Fig. 3, and they are hinged by one side to the side of the car, one each side of one of the windows 6.

A recess, 5, is formed in the side of the car, which the locker 4 covers when the latter is shut, as shown in Fig. 1, and said recess serves as a convenient receptacle for the bedding during the day.

The bed-lockers have a mirror, 7, secured thereto, and forming the center of the surrounding outer side thereof, suitable hooks being attached to the car, which engage with catches 8 on the lockers, whereby the latter are secured when shut against the side of the car.

Each locker 4 is capable of being swung to a position at right angles to the side of the car, as shown in Figs. 2 and 3, and it is supported and secured in said position by a peculiar hinged leg, 9. (Shown in Figs. 2, 3, and 5.) Said leg is hinged by its upper end to the lower end of the locker, in order that it may, when the latter is swung against the side of the car, be swung up against the lower end of the locker out of the way, in which position it is secured by any suitable means; but when the locker is opened, as in Fig. 3, said leg is swung to a perpendicular position over a screw-plate, 10, which is secured to the floor of the car. Said plate 10 has a short upwardly-projecting central stud which is screw-threaded, in which is a central bolt-socket. The said leg 9 has its lower end screw-threaded, and thereon is fitted a coupling, 11, which is adapted to screw onto said stud on plate 10, thereby securing the leg and plate to each other, as in Fig. 5. The leg 9 is also provided with a central bolt, 12, which is driven downward by a spring, 13, and an arm, 14, passes through a slot in the leg into said bolt, whereby the latter is lifted out of plate 10. Said bolt serves to facilitate the operation of quickly placing and securing the lower end of the leg 9 on plate 10 while the car is in motion, for as soon as said end is over the said socket in the plate the bolt will spring into it, and then the coupling 11 can be easily screwed to its stud.

The lockers 4 are arranged to swing outwardly all in the same direction, so that when two adjoining ones have been so swung, as in Fig. 2, the outer side of one is brought opposite the inner side of the next one, thereby bringing the mirror 7 at one end of the compartment formed by the said two lockers, said mirror constituting a great convenience to the occupants of the compartment. When said two lockers have been swung opposite each other, as above described, a bar, 15, which is pivoted to one edge of the locker near its upper end, and has a hook on its free end, is disengaged and swung upward to a horizontal position, and is hooked to a bolt on the edge of the adjoining locker, as shown in Fig. 2, thereby firmly uniting the upper ends of the lockers and holding them in proper position. The said rod 15 also constitutes a curtain-rod, on which, by hooks in the usual way, the requisite curtains are suspended which cover the side of the compartment adjoining the central passage through the car. Said rod, when the locker is not opened, hangs vertically on the edge of the latter in the position indicated by dotted lines in Fig. 3, and its lower end is engaged with a grooved catch, 16, Fig. 6, which is pivoted by one end in a case, 17, a spring (shown in dotted lines) under said catch holding the free end of the latter up. The case 17 is secured on the edge of the locker, as shown, in such position that when rod 15 hangs vertically its lower end engages with catch 16, and is prevented from swinging with the motion of the car. By depressing the free end of said catch the rod is freed therefrom.

The bed-frames 18, which are connected to each locker, as hereinafter described, are constructed as follows: Two side rails, 19, of wood, preferably, have each a re-enforcing plate, 20, secured to its inner side, as shown, (preferably let into said rail,) to give it great rigidity under the weight of the occupant of the bed, and eight cross-slats, 21, of iron, (four at each end,) are firmly bolted to said rails, and said slats are re-enforced by four longitudinal iron bars, 22, (two at each end of the frame,) which are bolted to said slats 21, and a strong doubled canvas center, 230, is secured around the two innermost iron slats 21, between the latter and the side rails, 19, and upon the bed-frame so made the mattress of the bed is laid, Fig. 2 showing the appearance of the made-up beds.

Two bed-frames, 18, are made of a width corresponding to that of the interior of the lockers, and are connected to the interior thereof by one end, as follows: The lower bed-frame is pivoted to the inner sides of the locker by bolts passing through the ends of the rails 19, as shown in Fig. 3, but far enough from the panel side of the locker to leave room for the upper bed-frame to stand between said side and the lower frame when both are folded within the locker in the positions shown in Fig. 4. The upper bed-frame is connected by one end to the locker by bolts passing through the ends of the side rails, and having wide heads, which engage in longitudinal grooves 23 (see Fig. 8) in the inner opposite sides of the locker. Said grooves extend from the bottom end of the locker upward to the height at which it is desired to fix the upper bed for use, and to facilitate the movement of the frame of the latter upward, to bring it to a horizontal position, a spring-actuated winding-shaft, 24, having a drum near each end is hung in the upper end of the locker, and around each drum thereon (and secured by one end thereto) is wound a thin metallic ribbon, and said ribbons are attached by one end to the end of the upper bed-frame, as shown. A suitable spring (not shown in the drawings) is attached to said shaft 24, against the force of which the end of the bed-frame is forced down to the lower end of the locker, and the opposite end of said frame is then swung under the upper end of the locker, as shown in Fig. 4, and when said upper end is swung outward away from the locker the said spring-shaft rotates, drawing the end of the bed-frame attached thereto upward, as in Fig. 3, and the free end of said frame is free to fall down onto the below-described supporting devices on the outer side of the opposite locker.

Four metallic bracket-cases, 26, are located in the outer side of the locker 4, as shown in Fig. 1, in each of which cases is pivoted a metallic bracket, 25, which, when turned up and shut into said case, is in the same plane as the face of the latter, and the case and bracket make a smooth finish on the locker. The inner side of the bracket 25 has two rising borders, between which the ends of the upper bed-frame lie, as shown in Figs. 3 and 9, whereby said frame is held against lateral motion. The said bracket 25 has a short arm extending beyond its pivot-point, on which is fixed a post and roller, 27, and a pivoted tongue, 28, hung on the inside of said case 26, has a spring, 29, attached to said case bearing against it and forcing it against said roller and stud, whereby, when the free end of the bracket is swung a short distance away from case 26, carrying said roller and stud above the pivot-point of the bracket, the action of spring 29 causes the latter to swing down at right angles to case 26, bringing its rear short arm under a projection, 30, on the inside of the case, and thereby the bracket is held rigidly in the position shown in Fig. 9, forming (two of them) an ample support for one end of the upper bed-frame. To provide for a positive engagement of the side rails of the bed-frame with said brackets the latter have the stud 132 formed thereon, which enters a hole in said rails (see Figs. 10 and 9) when the latter lie on the brackets. To hold the said bed-frame 18 in position on said bracket 25 and prevent the bed from swinging out of place by any accident, a self-acting stop, 31, is pivoted in said bracket-case 26, against which the bracket, when shut, swings, bringing it to the position shown in Fig. 11; but when the bracket is swung down the spring 32 behind said stop swings its lower end out beyond the face of the case 26, and when the end of the bed-frame rail swings down against the upper curved side of said stop the latter swings inward, letting the rail pass by it; but immediately it swings out again over the end of the rail, and thus prevents the latter from being lifted inadvertently off from the bracket.

When the upper and lower bed-frames are swung up into the locker, as shown in Fig. 4, each is held in that position by pivoted latches. (Shown at the upper end of the locker in Figs. 3 and 4.) The free end of the lower bed-frame, when the latter is swung to a horizontal position, as in Fig. 2, rests on said brackets 25 near the lower end of the opposite locker. The aforesaid end of the upper bed-frame which is connected to the said metallic bands, which are rolled around the drums on shaft 24, is, when raised to the position shown in Fig. 3, held up rigidly by two spring-catches, 33, Fig. 7, each of which is pivoted in a case, 34, and the latter is fixed in the narrow sides of the locker, as shown. A flat spring (shown in dotted lines in Fig. 7) is placed in case 34 behind the catch 33, and the free end of the latter swings inward when the bed-frame moves up past it, and said spring then throws said free end under the frame, thereby holding the latter up.

A hinged shelf, 35, is hung on the side of the car above each window, which is dropped down when the sleeping-compartment is occupied, and serves as a receptacle for objects belonging to the occupants thereof.

It is obvious that before the bed-lockers can be swung outward from their position against the side of the car and have the beds arranged in the compartments formed therebetween, as above described, the chairs 6 (shown in Fig. 1) must occupy some other position than that there shown, which is in practice the usual one near to the side of the car and the windows. Otherwise the lockers, or at least only one of the required two, can be opened, and therefore, to the end that comfortable revolving arm-chairs, as shown, may be available in a sleeping-car for day use, instead of the stiff seats in common use in such cars, the chairs herein shown are constructed and attached to the floor of the car, as below described.

The chair 6 is made with a seat-frame, 36, to receive the cushion, and having on its rear side two upturned short arms, 37, in the ends of each of which is a socket to receive a curved hook (shown in dotted lines in Fig. 1 and in full lines in Fig. 2) on the lower ends of the back-frame 38, said hooks engaging with a perforated metal plate fixed on the end of arm 37. To connect said back-frame to the seat-frame, the former is held inclined over the chair-seat, with said hooks over the holes in the ends of arms 37, and is then raised to the position shown in Fig. 1, thereby hooking the back and seat together. The arms 39 of the chair, made preferably of metal, are provided with the usual cushions, and are pivoted on opposite sides of the back-frame 38, and the arm-posts 40, also of metal, are pivoted on the opposite sides of the seat-frame 36, under said arms, the latter being capable of being swung upward on the sides of the back-frame, as shown in Figs. 1 and 13, and the arm-posts being capable of being swung down at the sides of the seat-frame, as shown in Fig. 1. The under side of the arm 39 is provided with a bolt (not shown in the drawings) to engage with the end of the post 40 and lock the arm and the latter together.

The seat-frame of the chair has the metallic socket 41 secured centrally to its under side, in the sides of which is a series of pin-holes, 42. A hollow post, 43, has its upper end fitting into said socket 41 and extending upward against a shoulder therein, and the end of said socket bears against a like shoulder on said post, as shown in Fig. 12, and the latter is provided with a series of pin-holes through its sides, corresponding with those above referred to in said socket. A pin (shown suspended to a chain under the chair) is adapted to be put through any of the coinciding holes in the socket and post, to lock them together and prevent the rotation of the socket on the post when desired, as below described. The said hollow post 43 has the interior thereof at its lower end screw-threaded, and has an annular groove around its outside, opposite said screwed portion thereof.

A metallic cylinder, 44, having a flange around its upper end, is let into the floor 3 of the car, said flange bearing on the floor, and the lower end, 45, of said cylinder has thereon a screw-threaded post, 46, standing upright and reaching quite or nearly to the upper end of said cylinder. A bolt, 47, having a spring behind it, as shown in Fig. 12, is placed in said flange on the cylinder 44, and is held by its spring in engagement with said groove in the outside of the hollow post 43.

The operation of changing said chair from the position and form shown in Fig. 1 to that shown in Fig. 2, whereby it is so arranged as to present no obstruction to the desired arrangement of the lockers, whereby a sleeping or other compartment is provided in the car, is as follows: The arms of the chair are unbolted from the post 40 and swung up beside the back-frame 38, and the latter is then swung forward and unhooked from the short arms 37 on the seat-frame and removed from the latter. The said posts are then swung down on the sides of the seat-frame, as shown in Fig. 2. The bolt 47 in the cylinder-flange is withdrawn from the groove in the hollow post 43, the pin under the chair is put into one of the holes in the said post and socket, and then by turning the seat-frame and the post 43 the latter is screwed downward on post 46, lowering the chair-seat down to the position shown in Fig. 2, and then the back of the chair is laid onto the seat, as there shown, the entire chair parts, when so arranged, being of less height from the floor than the under side of the lower bed in the compartment, and permitting the latter to be properly arranged therein, as shown.

When the car is changed from a sleeping to a parlor car for day use, the beds and lockers are returned to the positions indicated in Fig. 1, the back of the chair is removed from its recumbent position on the chair-seat, and the latter is turned as before, except in a reverse direction, thereby elevating said seat, and as the hollow post 43 moves upward the end of bolt 47 is by its spring held against its side; but when the end of the bolt encounters the outwardly-curved collar on the post above said annular groove therein the bolt is crowded back, and so remains until said groove comes up opposite the end of the bolt, when the latter engages in said groove, thereby stopping the further upward movement of said hollow post and the chair-seat. The pin locking the socket 41 and hollow post 43, one to the other, is then removed, and the back is attached to the seat-frame, as before, and the chair is then ready for use and has a free revolving motion on the hollow post 43. When it is found desirable to convert said chairs into a convenient sofa for the use of an invalid or otherwise, two thereof are turned side to side, as shown in Fig. 13, the adjoining arms and their posts are swung, respectively, to the side of the back-frame and the seat-frame, as in said figure, and an upholstered platform, 48, is placed between the two chairs, resting on the upper sides of the adjoining seat-frames, as shown. A cushion, 49, if need be, is placed against one of the chair-arms, and a convenient and easy sofa or couch is thereby formed.

The compartment formed by the two lockers above described, when swung at right angles to the side of the car and having a curtain hanging in front thereof, as above set forth, may be conveniently used as a private day-compartment by letting the beds remain secured in one of the lockers in the position shown in Fig. 4, and by leaving two chairs in the compartment, arranged as shown in Figs. 13 and 1; or, if preferred, the said chairs may be removed entirely by screwing the hollow post out of and removing it from the cylinder 44 and screw-post 46, and placing any other convenient chairs or seats in the said compartment.

In practice both sides of the sleeping-car are fitted with bed-lockers 4 and the above-described appurtenances and chairs, substantially as shown, whereby a series of day or sleeping compartments is provided on opposite sides, leaving the usual passage between them.

What I claim as my invention is—

1. A sleeping-car having a series of recesses, 5, in its inner side walls and a series of hollow bed-lockers hinged to said side walls at one side of said recesses and shutting over the latter, substantially as set forth.

2. The two lockers hinged to the side of the car in vertical positions, and constituting, when opened, the ends of the sleeping-compartment, and the bar 15, pivoted to one of said lockers, and having a hook on its free end engaging with a suitable bolt on the opposite locker, said bar constituting both a brace for holding the lockers firmly in an open position and a curtain-rod, combined and operating substantially as set forth.

3. The case 17, secured on the side of the locker, the catch 16, pivoted in said case and having a suitable spring thereunder, and the rod 15, hung on said locker and having its free end engaging with said catch, all combined as set forth.

4. The upper bed-frame having wide-headed bolts in the ends of the side rails at one end of the frame, the bed-locker having grooves 23 in the inner opposite sides thereof, in which the heads of said bolts engage and have a sliding motion, and the spring-actuated shaft 24, having a winding-drum thereon near each end, and a metallic ribbon for each drum connected to the latter and to the end of said bed-frame, combined and operating substantially as set forth.

5. The combination, with the bed-lockers 4 of a sleeping-car, of bed-frames therefor supported only by their ends on said lockers, consisting of the wooden side rails, 19, re-enforced by the longitudinal metal plate 20, secured on the side of each rail, the series of metal cross-slats 21 and longitudinal bars 22 near each end of the frame, and the canvas center 230, secured to the two inner cross-slats 21 of the frame, substantially as set forth.

6. In combination, the locker 4, having the slots 23 in the sides thereof, the upper bed-frame having one end pivoted to and sliding in engagement with said slots, the lower bed-frame pivoted to the inner opposite sides of the locker, between said grooves and the edges of the locker, and swinging into the latter outside of the upper bed-frame, and means, substantially as described, for temporarily securing the upper ends of said frames in the locker, substantially as set forth.

7. The bracket-cases 26, secured in the outer side of the locker, and each provided with a pivoted bracket, 25, to swing outwardly from and into said case, a spring-actuated stop, 31, also pivoted in said case above said bracket, a tongue, 28, pivoted in said case behind said bracket, and bearing on the rear end of the latter, and a spring, 29, acting against said tongue, combined and operating substantially as set forth.

8. In combination, the bracket-case 26, the bracket 25, pivoted in the latter and having the stud 132 and the post and roller 27 thereon, the spring-actuated tongue 28, pivoted in said case back of said bracket, and bearing against said roller, and the spring-actuated stop 31, pivoted in said case above said bracket, substantially as set forth.

9. The combination, with the locker 4 and the upper bed-frame, of the case 34, fixed in the side of the locker, and the spring-actuated catch 33, pivoted in said case, substantially as set forth.

10. The bed-lockers of a sleeping-car, hinged to the side thereof in a vertical position and constituting the ends of the sleeping-compartment, in which bed-frames are supported one above the other, extending between said lockers, a chair or chairs fixed on the floor of the car near said lockers, having a back capable of being turned from an upright to a horizontal position on the seat thereof, combined with a screw-threaded post fixed within a cylinder in the floor of the car, and a hollow post attached to the seat-frames of the chair and screwing onto said post in the car-floor, whereby by turning said frame the latter and the chair parts are lowered below the level of the lower one of said bed-frames, substantially as set forth.

11. As means for forming a sofa or couch in the car or within the sleeping-compartment formed by the lockers 4, two of the chairs 6, each having pivoted arms 39 and posts 40 thereon, swinging, respectively, on the back and on the seat-frames of said chairs, combined with an upholstered platform, 48, placed between said two chairs and resting on the seat-frames thereof, substantially as set forth.

12. A series of bed-lockers hinged to the side of a car and swinging at right angles thereto to form the ends of a sleeping-compartment, and a bed frame or frames supported between said lockers, combined with a chair or chairs connected to the floor of the car near said lockers, and capable, by means substantially as described, of being folded and lowered down without being removed from their positions on the floor, to permit the said bed-frame to be extended from locker to locker over said chair, substantially as set forth.

GUSTAVE LEVE.

Witnesses:
WM. H. CHAPIN,
G. M. CHAMBERLAIN.